United States Patent [19]

Rich et al.

[11] Patent Number: 4,967,084
[45] Date of Patent: Oct. 30, 1990

[54] MULTI-SAMPLE SCINTILLATION COUNTER USING POSITION-SENSITIVE DETECTOR

[75] Inventors: Arthur Rich, Ann Arbor; Ralph S. Conti, Ypsilanti; Bernard W. Agranoff, Ann Arbor, all of Mich.

[73] Assignee: The University of Michigan, Ann Arbor, Mich.

[21] Appl. No.: 305,873

[22] Filed: Feb. 2, 1989

[51] Int. Cl.[5] ............................................... G01T 1/28
[52] U.S. Cl. ............................ 250/361 R; 250/362; 250/366; 250/367; 250/369
[58] Field of Search ............ 250/366, 367, 369, 364, 250/362, 328, 361 R

[56] References Cited

U.S. PATENT DOCUMENTS

| | | | |
|---|---|---|---|
| 3,573,458 | 3/1969 | Anger | 250/366 |
| 3,701,901 | 10/1972 | Suhami et al. | 250/366 |
| 3,862,425 | 1/1975 | Myers | 250/366 |
| 3,955,088 | 5/1976 | Muehllehner et al. | 250/369 |
| 4,298,796 | 11/1981 | Warner et al. | 250/367 |
| 4,337,397 | 6/1982 | Vacher | 250/366 |
| 4,454,424 | 6/1984 | Strauss et al. | 250/366 |
| 4,485,307 | 11/1984 | Osborne et al. | 250/385.1 |
| 4,529,883 | 7/1985 | Yamakawa et al. | 250/366 |
| 4,841,151 | 6/1989 | Shope | 250/364 |

Primary Examiner—Constantine Hannaher
Assistant Examiner—Edward J. Glick
Attorney, Agent, or Firm—Rohm & Monsanto

[57] ABSTRACT

An arrangement for counting detectable events, such as scintillation events in a specimen sample utilizes first and second detector elements arranged on either side of the sample. The first detector is of the type which is able to produce information relative to the position of the event in the sample. The second detector generates a timing signal responsive to the detected event. In certain embodiments, the first detector also issues a timing signal in response to the detection of the event, and both timing signals are compared for temporal coincidence, whereupon circuitry for determining the position of the detectable event is triggered. The total energy of the event can be obtained from addition of the analog amplitudes of the timing signals. In certain embodiments, the second detector also produces position information, and the first and second detectors may provide respective coordinate values of a coordinate pair.

20 Claims, 10 Drawing Sheets

MULTI-SAMPLE SCINTILLATION COUNTER USING POSITION-SENSITIVE DETECTOR

BACKGROUND OF THE INVENTION

This invention relates generally to systems for producing signals responsive to the identification and location of a detectable event, and more particularly, to a system for monitoring and counting scintillation events in each of multiple samples simultaneously, employing a position-sensitive detector.

There exist numerous applications where it is desirable to evaluate certain characteristics of a sample, or multiple samples, to monitor the concentrations of radioactivity. For example, a cell harvester collects multiple labeled discrete precipitates on a flat sheet, and can have as many as 96 samples. It is desired that detectable events in each sample be counted independently, with little scatter from neighboring samples. Moreover, there is a need for an instrument which can count:

(a) a single sheet of impregnated matrix containing solid scintillant and multiple discrete radioactive samples, such as are deposited by a Brandell Harvester;

(b) individual Beckman caps; or (c) liquid scintillation vials using transparent tops.

Preferably, some 100 samples should be counted simultaneously.

There is additionally a need for an arrangement which can evaluate the patterns of radioactive proteins, illustratively in acrylamide gel slabs. Presently, autoradiographic means are employed to evaluate the radioactive proteins in acrylamide gel slabs. The known system is time-consuming, and not generally quantitative. In an application where such gels of about 20 cm by 20 cm are impregnated with fluor, whereby the distribution of radioactivity which is detected is measured and displayed on a CRT as it is collected, it is desirable to have high resolution. Current techniques for localization of the two-dimensional pattern of radioactivity rely upon autoradiography, wherein dried labeled gel is placed in contact with a photographic emulsion for extended periods, usually on the order of days to months, depending on the amount and energy of the radioactivity present. The results are not quantitative unless extensive calibration has first been performed with radioactive standards, or if the resulting autoradiogram is used as a guide for the excision of hot spots from the gel, followed by digestion of the samples, which are then counted in scintillation vials by standard techniques. If the radioactivity to be determined originates from tritium, it is necessary to impregnate the labeled gel with a fluor, so that a signal will reach the film emulsion before it is absorbed. These procedures are time-consuming, labor-intensive, and unquantitative, all of which establish a pronounced need for a new technology. Since the radioactivity is contained primarily inside the transparent gel, and does not reach the gel surface, position-sensing proportional counters are not useful for this application.

There is additionally a need for a system which can measure scintillation in a silica gel and other varieties of thin-layer chromatography, such as paper, glass, and other varieties of fiber matrices, such as are used in one and two-dimensional matrix chromatographic and electrophoretic separation. In these applications, the radioactivity is present on the surface of beads or fibers, and therefore the use of position-sensitive proportional gas flow counters is somewhat more appealing than in the case of gels. Nevertheless, flow counters leave much to be desired in that they are low in terms of counting efficiency and accuracy of quantification. In a typical system, substances which have been migrated by one- or two-dimensional chromatography are evaluated by scraping TLC plates, cutting paper, or exposing the intact plate or paper chromatogram to film. These known techniques, however, do not provide quick results or yield a quantitative analysis.

In the field of molecular biology, DNA/RNA hybridization is evaluated by blotting from a gel electrophorogram onto nitrocellulose, followed by autoradiography. The known technique, however, is time-consuming and does not yield accurate quantitative results. Additionally, there is a need to increase the speed with which new clones are detected, and to facilitate subtraction paradigms in which two or more two-dimensional samples are compared.

A still further area where there is a need for improved counting statistics is in the field of flow cells. As is known, counting accuracy is improved upon increasing the duration of the interval during which counting is performed. In essence, there is a need to increase the effective residence time of a radioactive, peak volume.

It is, therefore, an object of this invention to provide a simple and economical system for monitoring detectable events in a plurality of specimen samples.

It is another object of this invention to provide a system which can count detectable events in each of a plurality of neighboring samples, while eliminating the effect of the neighboring samples.

It is also an object of this invention to provide a system which can count detectable events in multiple discrete radioactive samples.

It is a further object of this invention to provide a system which can count detectable events in individual samples, such as Beckman caps.

It is additionally an object of this invention to provide a system which can count detectable events in liquid scintillation vials.

It is yet a further object of this invention to provide a system which can count detectable events in some one hundred samples simultaneously.

It is also another object of this invention to provide a system which can monitor the two-dimensional distribution of radioactivity in gel slabs.

It is yet an additional object of this invention to provide a system which can quantitatively analyze radioactive protein in acrylamide gel slabs.

It is still another object of this invention to provide a system which can rapidly and quantitatively count detectable events in silica gel and other thin layer chromatographic arrangements.

It is a yet further object of this invention to provide a system which can easily and quickly evaluate nucleic acid hybridization, and yield quantitative results.

It is also a further object of this invention to provide a system which can detect new clones during DNA/RNA hybridization, and facilitate subtraction paradigms.

It is additionally another object of this invention to provide a system which can be used in flow cell to increase the effective residence time of a radioactive slug, and thereby improve the accuracy of the event count.

A still further object of this invention is to provide a system which simply and economically achieves reliable scintillation counting of small samples.

SUMMARY OF THE INVENTION

The foregoing and other objects are achieved by this invention which provides an arrangement for monitoring a detectable event in a sample. In accordance with the invention, the sample is retained in a predetermined orientation within a sample region whereby the detectable event is detectable from first and second sides of a sample. A first detector is arranged on one side of the sample, for producing a first detector signal which is responsive to detection and location of the detectable event within the sample region. A second detector is arranged on the second side of the sample for producing a second detector signal which is responsive to detection of the detectable event.

Preferably, the sample is maintained substantially coplanar with the detector faces of the first and second detectors. Moreover, the distance between the sample and the detector faces is minimized so as to prevent diminution in resolution which may result from light spreading from the detectable event prior to reaching the detector. In a highly advantageous embodiment of the invention, the first and second detectors are photomultiplier tubes, and the sample is maintained in close proximity to the photocathodes thereof.

As indicated, the first detector is of a type which can generate information responsive to the location of the detectable event in the sample. Position analysis is performed, at least in part, with the aid of plural anode elements which are arranged in a first predetermined detector arrangement with respect to one another. The output signal of the first detector contains information which identifies the particular one of the detector anode elements which detected the detectable event. The detectable event may be a scintillation event resulting from radioactivity. The second detector may be a conventional single anode photomultiplier which serves primarily, in this embodiment, to generate timing pulses. Alternatively, the second detector may be capable of generating position information, and in certain embodiments, the first and second detectors generate respective ones of coordinate pair values.

In a highly advantageous embodiment of the invention, the first predetermined detector arrangement corresponds to the detector anode elements being configured as elongated anode elements, and the first predetermined detector arrangement corresponding to the elongated anode members being parallel to one another and to a first dimension. Thus, the first detector signal contains information corresponding to the first coordinate value of a coordinate pair. Similarly, the second detector may further be provided with a plurality of detector anode elements arranged in a second predetermined detector arrangement with respect to one another. Again, the second detector anodes may also be configured as elongated anode members arranged parallel to one another and to a second dimension which is substantially orthogonal to the first dimension. Thus, the second detector signal will contain information corresponding to a second coordinate value of a coordinate pair. Thus, each detector will issue one dimensional position information.

In a further, highly advantageous embodiment of the invention, the elongated anode members are in the form of wires, and both sets of orthogonal wire anodes can be included in only the first photodetector. The first and second sets of wire anodes in a single photodetector enable the detector to provide full, twodimensional position information. Each set of the elongated anode members may have associated therewith a respective resistive coding arrangement wherein position information is obtained in response to the proportion of total charge which is obtained, as a result of a resistive divider network. In certain embodiments of the invention, such signals are amplified and conducted to sample and hold arrangements which retain amplitude information. Thereafter, the sample and hold outputs are multiplexed, converted from analog to digital, and stored in a computer memory. The triggering of the sample and hold devices of the multiplexer is responsive to coincidence of the timing signals from the first and second detectors.

In a further embodiment of the invention, a resistive sheet anode is employed in the first detector for producing the first detector signal, with its associated position information. This resistive sheet anode, which may be of the Gear anode type, produces the position information as a function of charge proportion.

In other embodiments of the invention, the anode members may be arranged as an array of individual anodes. Such individual anodes may be provided within one photomultiplier tube, or alternatively, as the respective anodes of individual photomultiplier tubes, each with its own envelope.

In accordance with a further aspect of the invention, an arrangement for counting scintillation events in a sample in a sample region, is provided with a first photomultiplier having a first photomultiplier face facing the sample region. The first photomultiplier produces a first detection signal responsive to detection of a scintillation event, and a first position signal containing information responsive to the location of the scintillation event in the sample region. A second photomultiplier having a second photomultiplier face is provided facing the sample region and the first photomultiplier, the second photomultiplier produces a second detection signal responsive to detection of the detected scintillation event. In addition, there is provided a coincidence detector coupled to the first and second photomultipliers for determining temporal coincidence between the first and second detection signals. A position storage device stores the position information contained in the first position signal in response to the coincidence detection means.

In one embodiment of the further aspect of the invention, the first and second detection signals each have an amplitude characteristic responsive to the amplitude of the detected scintillation event, and there is further provided an energy summing arrangement for determining an energy content of the scintillation event in response to the first and second detection signals. The position storage device, in a highly advantageous embodiment, is provided with a sample-and-hold arrangement for retaining a value corresponding to the position information. Certain embodiments of the invention are further provided with a resistive encoder coupled to the first photomultiplier for distributing an electric charge to respective terminals thereof in proportion to the location of the scintillation event in the sample region.

In accordance with a method aspect of the invention, a method of counting scintillation events in a sample region, comprises the steps of: first monitoring the scintillation event with a first photomultiplier arrangement whereby the photomultiplier arrangement is caused to issue a signal which contains information responsive to the location of the scintillation events in the sample region; second monitoring the scintillation events with a second photomultiplier arrangement whereby the second photomultiplier arrangement is caused to issue a signal which contains information responsive to the time of occurrence of each of the scintillation events; and storing the location information obtained from the first photomultiplier arrangement associated with each scintillation event in response to the signal from the second photomultiplier arrangement.

BRIEF DESCRIPTION OF THE DRAWING

Comprehension of the invention is facilitated by reading the following detailed description, in conjunction with the annexed drawing, in which.

DETAILED DESCRIPTION

Figure 1:
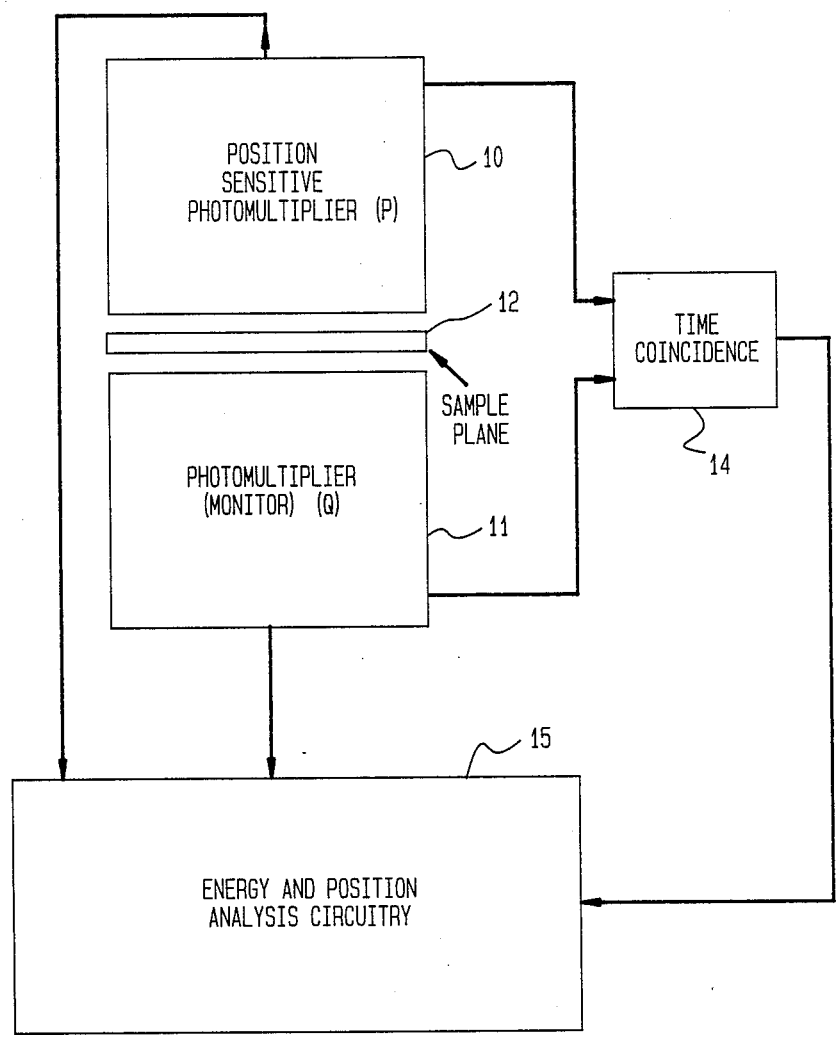
FIG. 1 is a partially schematic and partially function block diagram illustrating the major components of a specific illustrative embodiment of the present invention, and their interrelationship.

FIG. 1 is a block and line representation of a specific illustrative embodiment of the invention. A first detector 10, which is also designated as P, and a second detector 11, which is also designated as Q, are arranged on either side of a specimen sample array 12. In this specific embodiment, first and second detectors 10 and 11 are of the type which detect light, and may be photomultiplier tubes. Moreover, first detector 10 is of a type which can produce information pertaining to position, as will be discussed herein.

Specimen sample array 12 is arranged in a sample plane, and may be configured as a planar array of beta scintillation sources which emit light in both directions perpendicular to the sample plane. Thus, the light emitted from the samples in specimen sample array 12 is directed to first and second detectors 10 and 11.

Second detector 11, in this specific embodiment, need not be of the type which produces signals responsive to position. However, in other embodiments, as will be described hereinbelow, both photomultipliers P and Q may provide at their outputs data which is indicative of the location in the sample plane where a detectable event, which has a light emittance, is generated.

The first and second detectors are each of the type which generate pulses responsive to detection of an event. In the specific embodiment, each of the detectors will issue a timing pulse to a coincidence circuit 14. The coincidence circuit, upon receiving the simultaneous timing signals from the first and second detectors, issues an actuation signal to an energy and position analysis circuitry 15. Circuitry 15, as will be described hereinbelow in greater detail, determines the position of the detected event in the sample plane, and its total energy.

The present invention is not limited to any specific arrangement or configuration of specimen sample array 12. For example, specimen sample array 12 may be in the form of a plurality of discrete fixed samples which are substantially isolated from one another and located at various segregated locations in the sample plane. However, in a further application of the invention, the specimen sample may be a singular sample having a continuous distribution of activity. Thus, the position data obtained from the apparatus of the present invention could correspond to concentrations of materials having detectable activity, such as radioactivity. A still further application of the invention would employ a continuously moving sample whereby the distribution within the sample is time dependent. One configuration for such a sample might be a sample slug in a transparent tube at a known flow rate.

As previously stated, first detector 10, may be a photomultiplier tube having the capacity to provide position information. However, it is intended within the scope of the invention that first detector 10 be alternatively constructed as a plurality of single element photomultipliers which are spaced closely together such that their faces (not shown in this figure) are coplanar. Each such photomultiplier would have a single anode and may have an individual envelope (not shown in this figure), whereby an array of anode elements is produced. Of course, first detector 10 may be a single tube, such as one which is marketed under the trademark HAMAMATSU R2486 or R2488.

As previously indicated, second detector 11 may be a conventional photomultiplier tube having a uniform photocathode. However, this detector in certain embodiments may be of the type having electron multiplier dynodes which maintain position information. Such dynodes, as will be discussed hereinbelow, may be of the grid type, venetian blind type, channel electron multiplier array type, or may be position independent electron multipliers, such as the box type, fast linear focus type, and channeltron type. Moreover, second detector 11 may have a single envelope (not shown), or may consist of multiple stacked envelopes, illustratively having rectangular cross-section with high length-to-width ratios, or alternatively an array with closepacked envelopes having round, square, or hexagonal crosssections.

The timing, or coincidence, signals which are conducted to coincidence circuit 14 are obtained from photomultipliers P and Q in a number of ways. For example, the timing signals may be obtained from the anodes of the photomultipliers. Alternatively, such signals may be obtained from the dynodes. In any event, the timing signals from photomultipliers P and Q are relatively fast. In certain embodiments of the invention, a timing signal from photomultiplier P is not used, and instead, the timing signal from photomultiplier Q alone triggers digitization of the slow position signals from photomultiplier P.

Figure 2:
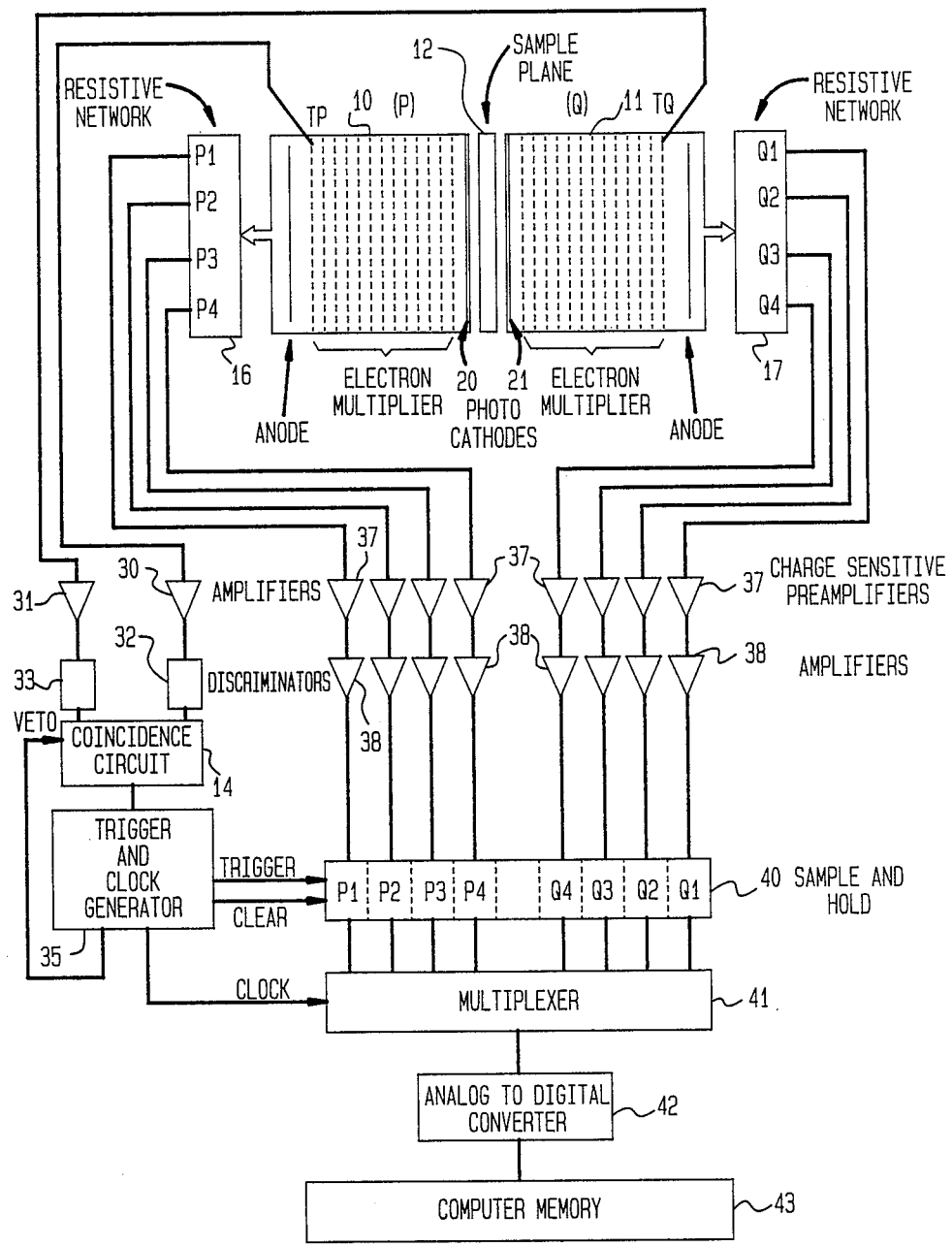
FIG. 2 is a schematic representation of the embodiment of FIG. 1, further showing logic circuitry.

FIG. 2 is a partially schematic and block and line representation of a specific illustrative embodiment of the invention. Elements of structure having analogous correspondence to those discussed hereinabove with respect to FIG. 1 are similarly designated.

As previously noted, specimen sample array 12 which is disposed on the sample plane consists of either a discrete or a continuous distribution of light generating events such as the scintillation of beta particles in an appropriate liquid or solid fluor. The light which is emitted from a single such event exits the sample in both directions perpendicular to the sample plane and strikes photocathodes 20 and 21 of first detector 10 (P) and second detector 11 (Q), respectively. The distances between the samples and the photocathodes are minimized in order to reduce the loss of position information as a result of spreading of the light.

As shown in the figure, first detector 10, which is a photomultiplier, has an electron multiplier section 22, and similarly, second detector 11 is provided with a respective electron multiplier section 23. The electron multiplier section of photomultiplier P must preserve the position information through its associated anode 24. This is achieved by employing a variety of electron multipliers in electron multiplier 22, including grid type dynodes, venetian blind dynodes, and channel electron multiplier arrays. In certain embodiments of the invention, electron multiplier section 23 of photomultiplier Q need not be position sensitive, and therefore, in those cases any electron multiplier structure is acceptable to cause electrons to be propagated to anode 25 thereof.

Fast timing signals TP and TQ are derived from the respective final dynodes of photomultipliers P and Q. These signals are amplified at amplifiers 30 and 31, respectively, and conducted to respective discriminators 32 and 33. Discriminator 32 and 33 are pulse height discriminators which are set to provide a fast logic upper pulse when a single photoelectron has been emitted from the correspondingly associated photocathode. The fast logic pulses from channels P and Q are provided to a coincidence circuit 14 which provides at its output a fast logic pulse when the input pulses temporally overlap. The output of coincidence circuit 14 is conducted to a trigger and clock generator 35 which provides four timed output pulses. The first output is a veto pulse which is conducted back to coincidence circuit 14 for the purpose of turning off the coincidence during the digitization of the analog signals and thereby avoid con fusion between closely spaced events. The remaining three signals, the trigger, clear, and clock pulses, are described in detail hereinbelow.

In this embodiment of the invention, a variety of different configurations of anodes and corresponding resistive encoding networks are contemplated, such as resistive encoding networks 16 and 17, shown in FIG. 2. The details of each such arrangement are discussed hereinbelow, however, they all share the property of having up to four charge pulse outputs per photomultiplier. Referring to FIG. 2, the outputs are labeled P1 through P4 and Q1 through Q4. Each of these signals is conducted to a respectively associated one of charge-sensitive preamplifiers 37. The outputs of each of charge-sensitive amplifiers 37 is amplified by a respectively associated one of amplifiers 38. Amplifiers 38 are shaping amplifiers having a characteristic time constant $\tau_f$ on the order of one microsecond. Each amplifier produces at its output a voltage pulse proportional to the amount of charge produced in that channel from the resistive and coding network. These upper pulses then are conducted to sample and hold devices 40 which track the input pulses until a trigger signal causes the sample and hold devices all to go into the (hold) mode simultaneously. The trigger pulse is received from trigger and clock generator 35.

In the hold state, output voltage of sample and hold devices 40 remains constant at the value of the input voltage when the trigger pulse was received. The trigger pulse is timed to arrive at the same time as the peak of the input voltage from the amplifiers. This is readily apparent from FIG. 3 which is a graphical plot of a plurality of timing and other pulses shown on a common time scale.

Figure 3:
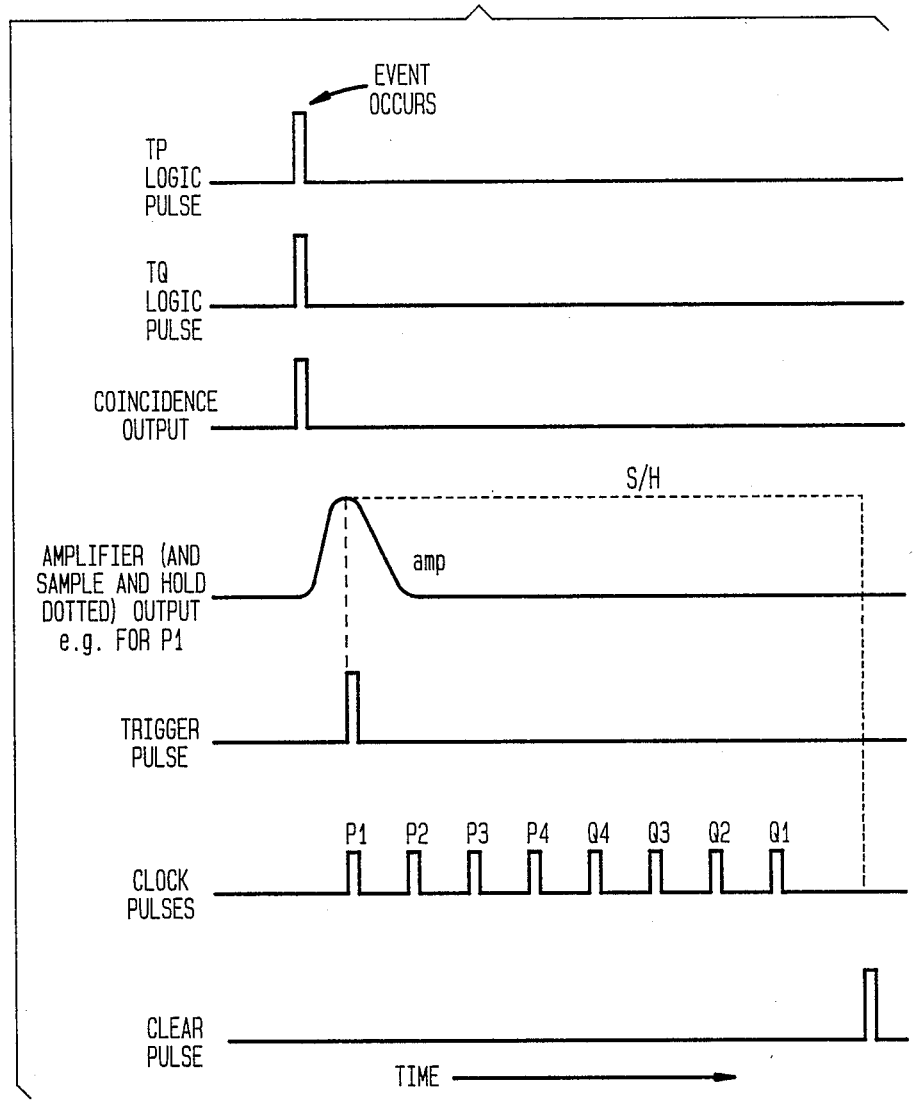
FIG. 3 is a plurality of wave forms shown on a common time scale, for illustrating the timing sequences within the embodiment of FIG. 2.

Referring once again to FIG. 2, the outputs of sample and hold devices 40 are conducted to a multiplexer 41 which scans through the sample and hold channels in response to clock pulses received from trigger and clock generator 35. Again, these clock pulses are shown in FIG. 3. In response to the clock pulses, each channel of the sample and hold devices is conducted sequentially through multiplexer 41 to an analog-to-digital converter 42. The analog-to-digital converter converts the pulse heights provided at its input and issues at its output digital signals to a computer memory 43. Upon completion of the sampling, a "clear" pulse from trigger and clock generator 35 returns the sample and hold devices to the sample mode, after all of the channels have been read out.

Processing in a computer (not shown) differs depending upon which anode and resistive encoding method is used, and will be discussed in the individual cases hereinbelow. The result of such processing is the same, however, resulting in values of the x and y coordinates in the sample plane and the total energy E of the event. All events received during a data acquisition interval are histogrammed according to position and energy. These are the data required for interpretation of the various applications.

Figure 4A:
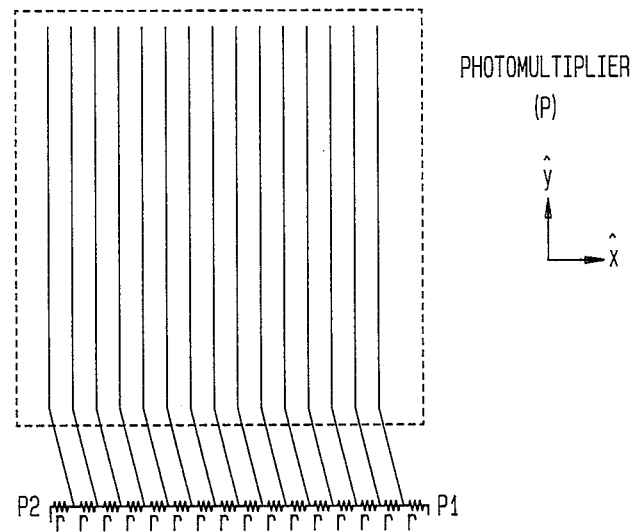
FIGS. 4A and 4B are schematic representations of two photomultiplier strip anode arrangements each with resistive encoding.
Figure 4B:
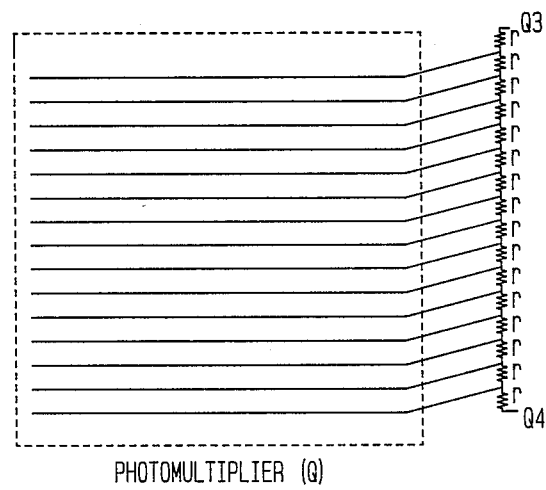

The first case of an encoding configuration is illustrated in FIGS. 4A and 4B. The anode of photomultiplier P consists of a large number of evenly spaced parallel wires. Each such wire has an external connection to a resistor chain, as shown in FIG. 4A where the characteristic resistance of each element is r = 1 kΩ to 1 MΩ. Using the charge division method, the position of a given event in the x direction is determined by the relative amount of charge reaching the preamplifiers attached at P1 and P2, with a characteristic time of $\tau_f$, according to:

$$x = k \cdot \frac{P1}{P1 + P2}$$

where k is a constant. Similarly, the parallel wires in the anode of photomultiplier Q extend in the perpendicular direction, as shown in FIG. 4B. The outputs Q3 and Q4 of the attached resistor chain allow the vertical position of the event to be determined according to:

$$y = k \cdot \frac{Q3}{Q3 + Q4}$$

The energy of the event is determined from:

$$E = \eta \cdot (P1 + P2 + Q3 + Q4)$$

The constants k and $\eta$ can be calibrated by events of known position and energy.

Figure 5:
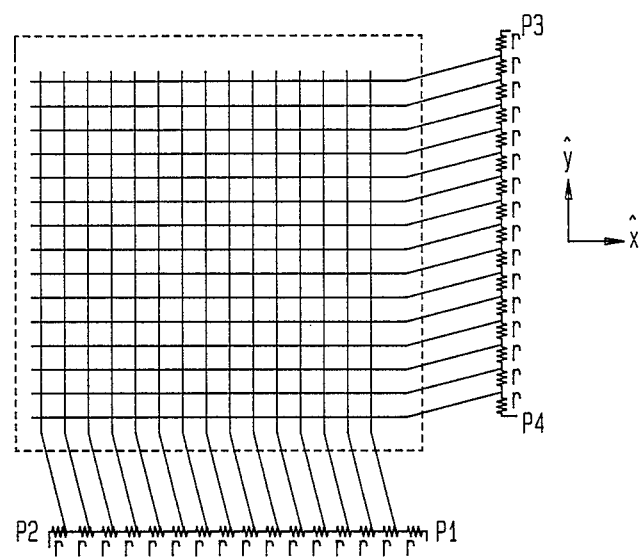
FIG. 5 is a schematic representation of the manner in which the strip anodes of FIGS. 4A and 4B could be incorporated into a single detector unit.

The second coding configuration is illustrated in FIG. 5. In this case, two parallel wire anodes are included within the same photomultiplier P such that they both sample the cloud of electrons coming from the electron multiplier (one with orientation as in FIG. 4A and the other as in FIG. 4B). As above, the x and y positions are determined from:

$$x = k \cdot \frac{P1}{P1 + P2}$$

and $$y = k \cdot \frac{P3}{P3 + P4}$$

The photomultiplier Q need have no position sensitivity. It is simply used to provide a single pulse proportional to the energy from output Q1. In this case the energy is determined from:

$$E = \eta \cdot P1 + P2 + P3 + P4 + Q1)$$

A variation on this configuration has the x and y sensitivity in both P and Q photomultipliers. In this case, separate x and y coordinates are determined for each of P and Q according to:

$$x(P) = k(P) \cdot \frac{P1}{P1 + P2}$$

$$y(P) = k(P) \cdot \frac{P3}{P3 + P4}$$

$$x(Q) = k(Q) \cdot \frac{Q1}{Q1 + Q2}$$

and $$y(Q) = k(Q) \cdot \frac{Q3}{Q3 + Q4}$$

An average position for each event would be computed unless the values differed too greatly (more than three times the expected standard error) in which case the event would be rejected. The energy would be, as usual:

$$E = \eta \cdot (P1 + P2 + P3 + P4 + Q1 + Q2 + Q3 + Q4)$$

An important consideration with these anodes consisting of discrete wires is that the wire spacings ax and ay (see, FIGS. 4A and 4B) are smaller than the spread o of the electron cloud (at the anode) from a single event.

Figure 6A:
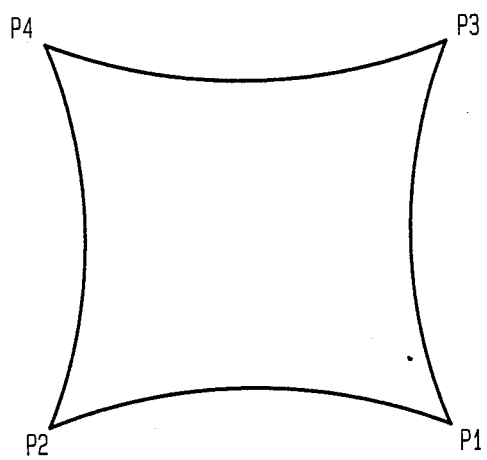
FIGS. 6A and 6B are schematic representations of resistive sheet, or Gear, anodes.
Figure 6B:
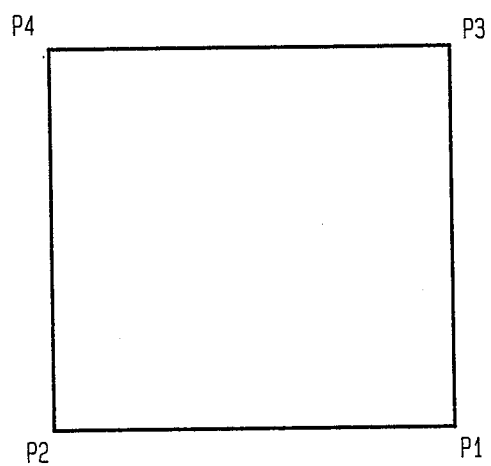

FIGS. 6A and 6B illustrate a third anode configuration which consists of a sheet of uniformly resistive material having a square shape (FIG. 6B) or a circular arc shape with a corrective border resistance (FIG. 6A). These are so-called "Gear anodes." The output signals can be collected at a variety of positions, but the ones most usually employed are as indicated in FIGS. 6A and 6B. Since these anodes consist of continuous sheets, as opposed to discrete wires as discussed hereinabove, full use can be made of the very small single event electron spread c which is obtainable from channel-electron-multiplier-array type electron multipliers, particularly in applications in which the higher resolution justifies the higher cost of these components. If photomultiplier P has a Gear anode and photomultiplier Q is used as a monitor with only one output Q1, then the x,y positions are determined from.

$$x = k \cdot \frac{P1 + P3}{P1 + P2 + P3 + P4}$$

and $$y = k \cdot \frac{P3 + P4}{P1 + P2 + P3 + P4}$$

In this case, the energy is:

$$E = \eta \cdot (P1 + P2 + P3 + P4 + Q1)$$

If Gear anodes are used in both P and Q, then, as above, the positions are separately computed for each according to:

$$x(P) = k(P) \cdot \frac{P1 + P3}{P1 + P2 + P3 + P4}$$

$$y(P) = k(P) \cdot \frac{P3 + P4}{P1 + P2 + P3 + P4}$$

$$x(Q) = k(Q) \cdot \frac{Q1 + Q3}{Q1 + Q2 + Q3 + Q4}$$

and $$y(Q) = k(Q) \cdot \frac{Q3 + Q4}{Q1 + Q2 + Q3 + Q4}$$

and an average position for each event would be computed as above. The energy would be:

$$E = \cdot (P1 + P2 + P3 + P4 + Q1 + Q2 + Q3 + Q4)$$

In the above configurations, non-ideal geometries and imperfections in the resistive elements can lead to distortions from the ideal positions given in the corresponding linear equations. These distortions can be corrected once a one-to-one mapping is made of actual position of a test pulse source versus its measured position.

A second approach which is contemplated within the scope of the present invention employs discrete encoding. The discrete encoding method differs from the above-described system principally in that a signal obtained directly from each anode is amplified and then digitized with no intervening resistive coding. Again the light in the two half planes is sensed by photomultipliers P and Q. There is, however, in this embodiment, a one-to-one mapping of light emitted from an event in a fixed area of the sample plane to a corresponding anode, and then in a single channel through amplifiers and analog-to-digital converters. In such a system, it is important to ensure that signals from one sample area are not detected by the electronics corresponding to another, as such cross-talk would affect the size resolution which can be achieved with various arrangements of electron multiplier and envelope structures. Moreover, spreading of the electron cloud in the multiplier section would demand correspondingly large anode sizes and separations. Such spreading can be reduced in a number of ways, including providing:

(1) small spacing between successive dynode stages and small cathode to first dynode spacing;

(2) an axial magnetic field when compatible with the photomultiplier structure; and (3) confining walls, either separate envelopes for each anode, or intra-envelope partitions, for example, a channel electron multiplier array.

Figure 7:
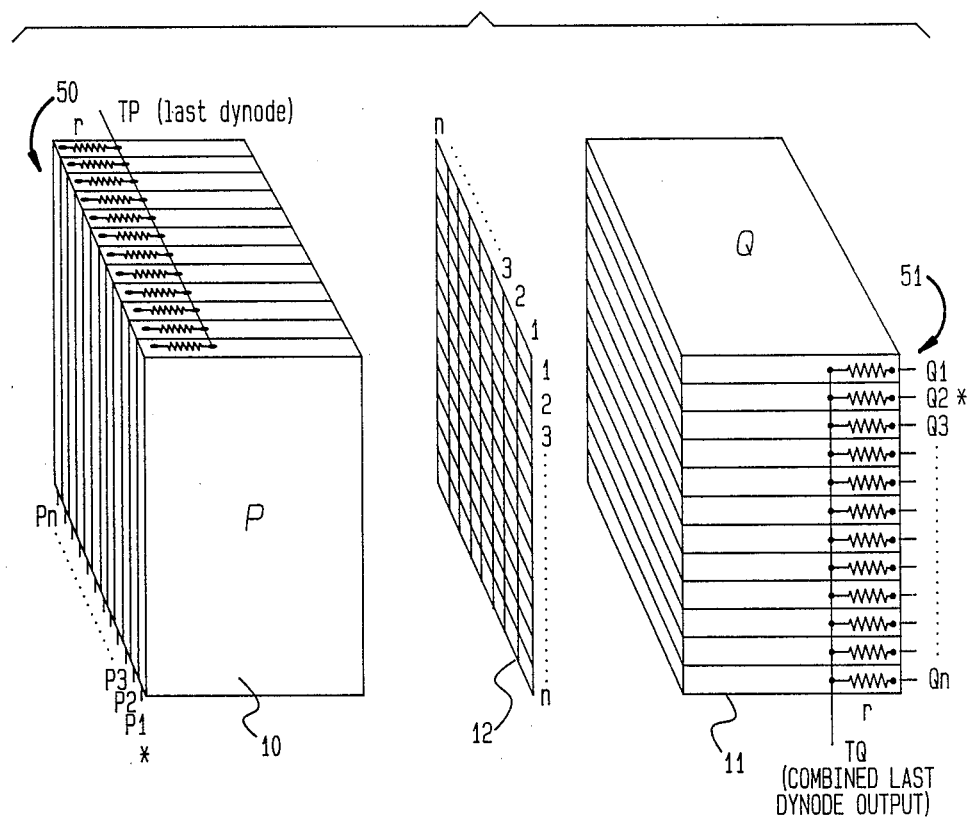
FIG. 7 is a partially schematic isometric representation of a specific illustrative embodiment of the invention.

FIG. 7 is a partially schematic, isometric representation of a specific illustrative embodiment of the present invention. Elements of structure bearing analogous correspondence to elements discussed hereinabove with respect to the other embodiments are similarly designated. The embodiment of FIG. 7 illustrates schematically a plurality of strip-shaped anodes 50 having a high aspect ratio (length:width) which are stacked in photomultiplier P to yield a square array. The anodes 51 of photomultiplier Q are identical except that they are rotated by 90° about an axis (not shown) normal to the anode plane. Each anode in anode stacks 50 and 51 can be contained in separate tube envelope, as shown in this figure, or there can be provided only one tube envelope and dynode structure in alternative embodiments. Any number (n) of anodes can be included in each of photomultipliers P and Q so long as the length of each anode exceeds n times the width by enough space to allow spreading of the electron cloud or inclusion of partitions. If, for example, simultaneous signals are observed from anodes P1 and Q2, then the event is deduced to have occurred in square (1, 2) of the sample plane of specimen sample array 12. In this manner, events from small $n^2$ distinct samples can be separately measured for total energy and counted.

Figure 8:
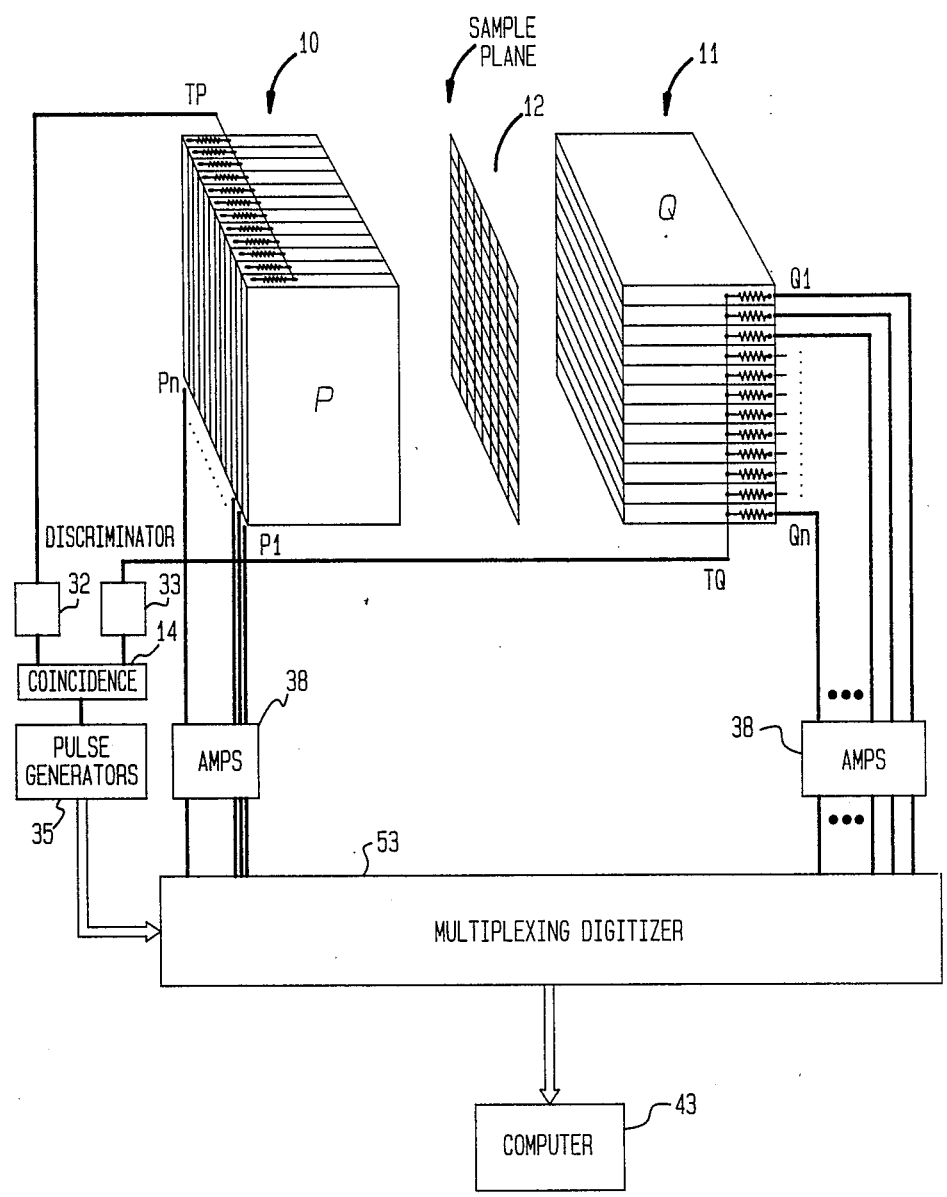
FIG. 8 is a partially schematic isometric representation of the embodiment of FIG. 7 additionally showing related circuitry in function block form.

FIG. 8 is a partially schematic and block and line representation of a specific embodiment of the invention wherein the structure of FIG. 7 is included with electronic systems necessary to operate the arrangement. As described hereinabove with respect to FIG. 2, a signal from each of photomultipliers P and Q are discriminated in discriminators 32 and 33 in terms of pulse height and turned into logic pulses which are subsequently tested for temporal overlap in fast coincidence circuit 14. In embodiments of the invention where a single dynode structure is used for each of photomultipliers P and Q, the discriminator signals can be obtained from the last dynode. In an embodiment where n separate electron multiplier structures, as shown in FIGS. 7 and 8, are obtained from the last dynode of each photomultiplier, the signals are analog added and then discriminated before the coincidence is tested. In a manner similar to that disclosed hereinabove with respect to FIG. 2, the occurrence of a coincidence triggers the reading out (digitization) of the amplified anode signals via multiplexing digitizer 53. In this specific embodiment, there will be 2 n such numbers, P1 through Pn and Q1 through Qn. Only events that have exactly one Pi and one Qj non-zero digitized signals are histogrammed. The energy of the sample at (i,j) is given by:

$$E(i,j) = \eta \cdot (Pi + Qj)$$

Figure 9:
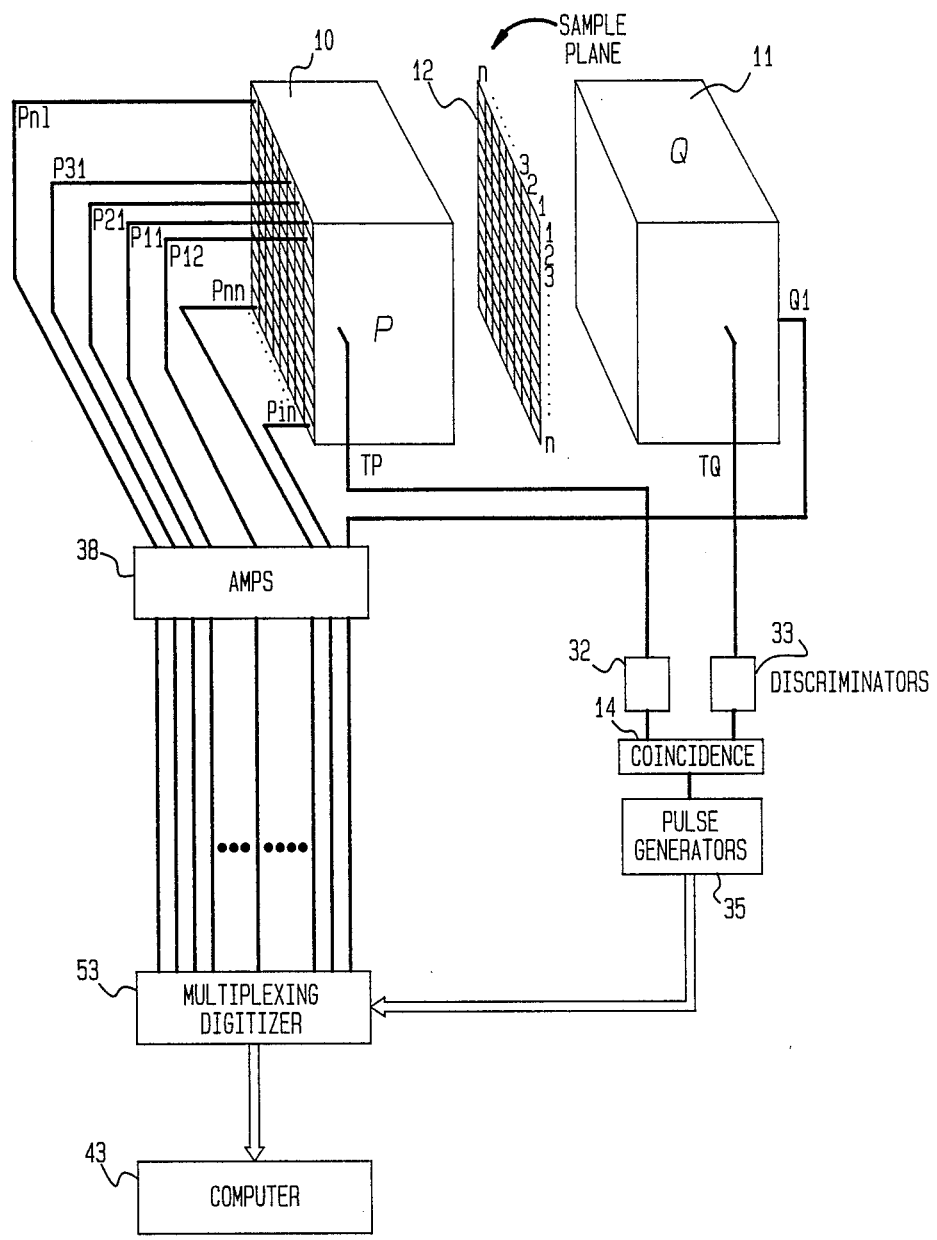
FIG. 9 is a partially schematic isometric representation of a further embodiment of the invention wherein one detector provides all location information.

FIG. 9 illustrates a further anode configuration which is useful in the practice of the present invention. In this specific embodiment, photomultiplier P has anodes arranged illustratively in a square array with sufficient distance therebetween to avoid cross-talk. The anodes are identified (i,j) accordingly to position and issue signals Pij. In accordance with the previous discussion, the anodes can be individually contained in separate envelopes or, as shown in this figure, they all may be contained in one envelope.

Photomultiplier Q, in the embodiment of FIG. 9, is provided with a single large area anode which yields a signal Q1. The last dynode of photomultiplier Q can provide, after discrimination in discriminator 33, one of the logic pulses to coincidence circuit 14. The other coincidence, or timing pulse, is obtained from the ganged dynodes of photomultiplier P. The logic pulse from coincidence circuit 14 triggers digitization of signals Q1 and Pij, where i = 1, 2, ...., n and j = 1, 2, ..., n. When exactly one Pij has a non-zero digitized value, position (i,j) is histogrammed with an energy given by:

$$E(i,j) = \cdot(Pij + Q1)$$

Figure 10:
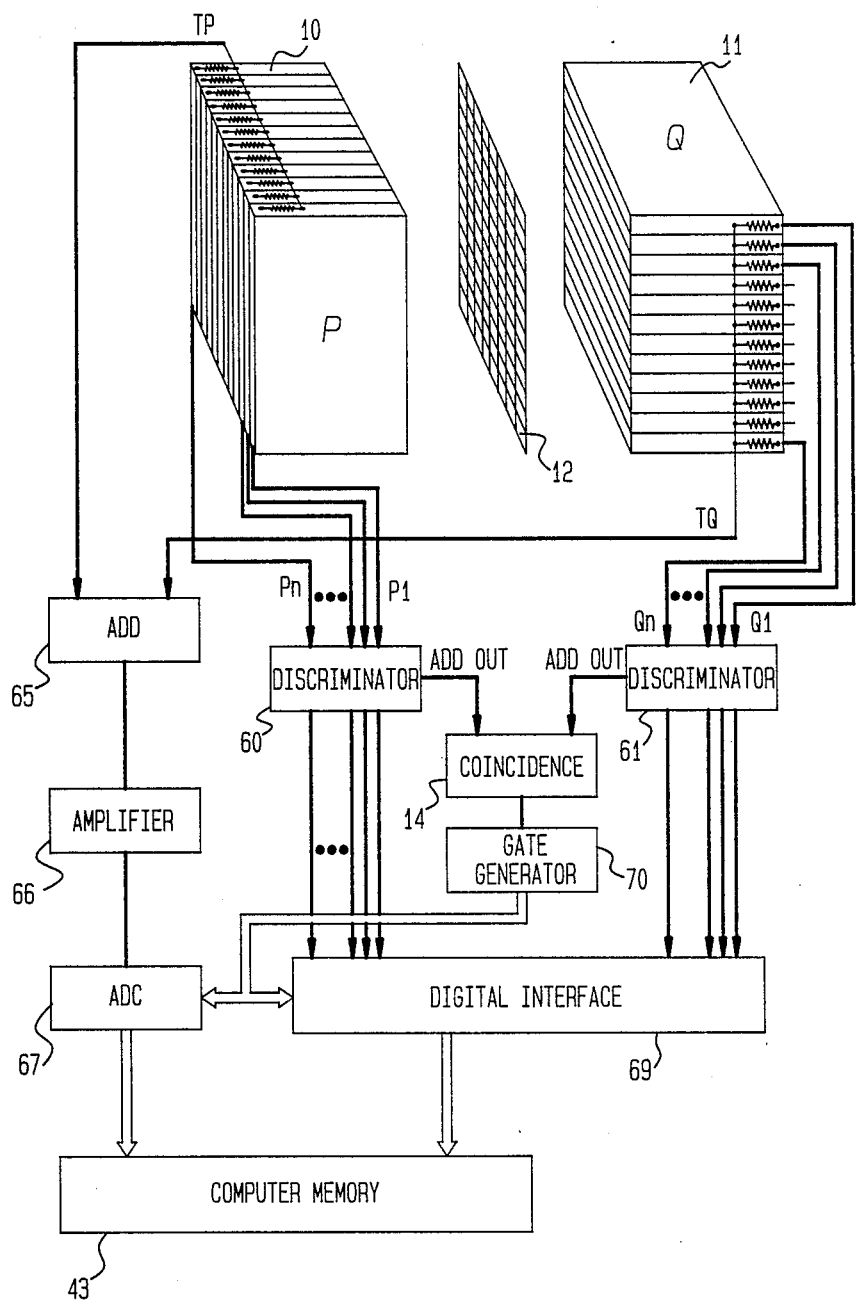
FIG. 10 is a partially schematic isometric representation of a specific illustrative embodiment of the invention wherein each of the photodetectors is position sensitive and associated with a respective dimension in a two-dimensional system.

FIG. 10 is a partially schematic and isometric block and line representation of a specific illustrative embodiment of the invention wherein photomultipliers P and Q each provide position information. In this embodiment, the position for a given event is encoded by electronics before digitization, assuming the anode configuration is similar to that shown in FIG. 7. In the embodiment of FIG. 10, each anode signal, for both photomultipliers P and Q, is discriminated in respectively associated discriminators 60 and 61. The hit pattern, which is formed of logic zeros and ones for each discriminator output, is recorded for each event, as it is the summed energy output. Only events with exactly one P signal and one Q signal are histogrammed.

The summation of the P and Q timing signals is performed in adder circuit 65 which issues its output to an amplifier 66, and then the analog value is converted to digital value in analog-to-digital convertor 67. This digital value, which corresponds to the total energy of the event, is conducted to computer memory 43. Analog-to-digital convertor 67, as well as digital interface 69, which issues at its output the logical zeros and ones corresponding to each discriminator output, are responsive to coincidence circuit 14, via a gate pulse generator 70.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for monitoring a multiplicity of detectable events in a sample, the sample being characterized by a substantially two-dimensional surface distribution of the detectable events, the arrangement comprising:

sample holder means for holding the sample in a predetermined orientation whereby the detectable events are detectable from first and second sides of said sample holder means, said first and second sides corresponding to opposite sides of the two dimensional surface distribution of the detectable events;

first detector means arranged on said first side of said sample holder means and having a detector input arranged in predetermined relation with respect to the sample whereby said detector input is substantially parallel with the two-dimensional surface distribution, said detector input being situated in the vicinity of a predetermined region of the two-dimensional surface distribution, for producing a first detector signal at an output thereof, said first detector signal having a detector portion responsive to the detection of the detectable events by said first detector means, and a location portion containing information responsive to the position of each of said detected detectable events in said predetermined region of the twodimensional surface distribution of the sample;

second detector means arranged on said second side of said sample holder means, for producing a second detector signal at an output thereof responsive to detection of the detectable events by said second detector means;

discriminator means for receiving said detector portion of said first detector signal responsive to said detection of said detected detectable events and providing at an output thereof a first detection logic pulse responsive to a magnitude of said detector portion of said first detector signal; and coincidence detection means for producing a logic signal responsive to temporal coincidence of said first detection logic pulse and said second detector signal.

2. The arrangement of claim 1 wherein said second detector means has a detector input, and said predetermined orientation in which the sample is held by said sample holder means is substantially parallel to said detector inputs of said first and second detector means.

3. The arrangement of claim 1 wherein said first detector means further comprises a plurality of first event detector anode elements arranged in a first predetermined detector arrangement with respect to one another.

4. The arrangement of claim 3 wherein said first detector signal contains information identifying which of said first event detector anode elements detected the detectable event.

5. The arrangement of claim 3 wherein said first event detector anode elements are configured as elongated anode members, and said first predetermined detector arrangement corresponds to said elongated anode members parallel to each other and to a first dimension, whereby said first detector signal contains information corresponding to a first coordinate value of a coordinate pair.

6. The arrangement of claim 5 wherein said second detector means further comprises a plurality of second event detector anode elements arranged in a second predetermined detector arrangement with respect to one another, said second detector signal being responsive to position of the detectable event, said second event detector anode elements are configured as elongated anode members, and said second predetermined detector arrangement corresponds to said elongated anode members parallel to each other and to a second dimension substantially orthogonal to said first dimension, whereby said second detector signal contains information corresponding to a second coordinate value of a coordinate pair.

7. The arrangement of claim 6 wherein said elongated anode members are wires.

8. The arrangement of claim 6 wherein there is further provided resistive encoder means for determining a position of the detectable event with respect to said elongated anode members.

9. The arrangement of claim 5 wherein said first detector means further comprises a further plurality of first event detector anode elements arranged in a further predetermined detector arrangement with respect to one another, said second plurality of said first event detector anode elements are configured as elongated anode members, and said further predetermined detector arrangement corresponds to said elongated anode members parallel to each other and to a further dimension substantially orthogonal to said first dimension, whereby said first detector signal contains information corresponding to coordinate values of a coordinate pair.

10. The arrangement of claim 1 wherein said first detector means comprises resistive sheet anode means for producing said first detector signal.

11. The arrangement of claim 1 wherein said first detector means comprises a plurality of anode members arranged as an array.

12. The arrangement of claim 11 wherein said first detector means comprises a plurality of photomultiplier detector elements arranged as an array, each of said anode members corresponding to a respectively associated one of said photomultiplier detector elements.

13. The arrangement of claim 1 wherein there is further provided coincidence detection means for producing a coincidence signal responsive to said second detector means.

14. The arrangement of claim 13 wherein said coincidence detection means is coupled to said first detector means and responsive to a timing signal therefrom.

15. The arrangement of claim 1 wherein said sample holder means is arranged to hold a plurality of samples in predetermined spaced apart relation, and coplanar, to one another, intermediate of said first and second detector means.

16. An arrangement for counting and monitoring a distribution of scintillation events in a sample in a two-dimensional sample region having a two-dimensional distribution of the scintillation events, the arrangement comprising:

first photomultiplier means having a first photomultiplier face facing the two-dimensional sample region from a first side thereof, said first photomultiplier means producing a first detection signal responsive to detection of a scintillation event, and a first position signal containing information responsive to the location of the scintillation event in the sample region across said first photomultiplier face;

second photomultiplier means having a second photomultiplier face facing the two-dimensional sample region and said first photomultiplier means from a second, opposite side of the twodimensional sample region, said second photomultiplier producing a second detection signal responsive to detection of the detected scintillation event;

coincidence detection means coupled to said first and second photomultiplier means for determining temporal coincidence between said first and second detection signals; and position storage means for storing the position information contained in said first position signal in response to said coincidence detection means.

17. The arrangement of claim 16 wherein said first and second detection signals each have an amplitude characteristic responsive to the amplitude of the detected scintillation event, and there is further provided energy summing means for determining an energy content of the scintillation event in response to said first and second detection signals.

18. The arrangement of claim 16 wherein said position storage means comprises sample-and-hold means for retaining a value corresponding to said position information.

19. The arrangement of claim 16 wherein there is further provided resistive encoder means coupled to said first photomultiplier means for distributing an electric charge to respective terminals thereof in proportion to the location of the scintillation event in the sample region.

20. A method of counting scintillation events in a two-dimensional sample region, the method comprising the steps of:
  first monitoring the scintillation even with a first photomultiplier arrangement having a detection face which is arranged to overlie the two-dimensional sample region, whereby the photomultiplier arrangement is caused to issue a signal which contains information responsive to the time of detection of the scintillation events and to the location of the scintillation events in the two-dimensional sample region;
  second monitoring the scintillation events with a second photomultiplier arrangement whereby the second photomultiplier arrangement is caused to issue a signal which contains information responsive to the time of occurrence of each of the scintillation events; and
  storing said location obtained from said first photomultiplier arrangement associated with each scintillation event in response to temporal coincidence between said signals from said first and second photomultiplier arrangements.

* * * * *